(12) United States Patent
Eilken et al.

(10) Patent No.: US 11,052,991 B2
(45) Date of Patent: Jul. 6, 2021

(54) FAIRING FOR AN AIRCRAFT

(71) Applicant: Airbus Operations GmbH, Hamburg (DE)

(72) Inventors: Wolfgang Eilken, Hamburg (DE);
Memis Tiryaki, Hamburg (DE);
Klaus-Peter Sanmann, Hamburg (DE);
Ghasem Moussavi, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 765 days.

(21) Appl. No.: 15/801,536

(22) Filed: Nov. 2, 2017

(65) Prior Publication Data
US 2018/0118328 A1      May 3, 2018

(30) Foreign Application Priority Data

Nov. 2, 2016   (EP) .................................... 16196833

(51) Int. Cl.
| B64C 7/00 | (2006.01) |
| F16J 15/02 | (2006.01) |
| B64C 5/06 | (2006.01) |

(52) U.S. Cl.
CPC ................. B64C 7/00 (2013.01); B64C 5/06 (2013.01); F16J 15/02 (2013.01)

(58) Field of Classification Search
CPC .................................... B64C 7/00; B64C 1/26
See application file for complete search history.

(56) References Cited

U.S. PATENT DOCUMENTS

| 5,071,092 | A | 12/1991 | Williams et al. | |
|---|---|---|---|---|
| 5,915,653 | A * | 6/1999 | Koppelman | B64C 7/00 244/129.1 |
| 6,450,457 | B1 | 9/2002 | Sharp | |
| 7,407,135 | B2 * | 8/2008 | Rouyre | B64C 7/00 244/119 |
| 7,694,915 | B2 * | 4/2010 | Mindermann | B64C 7/00 244/130 |
| 8,177,169 | B2 * | 5/2012 | Lobo Barros | B64C 1/26 244/131 |
| 8,876,051 | B2 * | 11/2014 | Stewart | B64C 7/00 244/130 |
| 8,985,941 | B2 * | 3/2015 | Mayes | C23C 4/185 415/134 |

(Continued)

FOREIGN PATENT DOCUMENTS

| GB | 2238026 | 5/1991 |
| GB | 2323576 | 9/1998 |
| WO | 2007071762 | 6/2007 |

OTHER PUBLICATIONS

European Search Report, 2017-003-16 priority document.

*Primary Examiner* — Richard R. Green
(74) *Attorney, Agent, or Firm* — Greer, Burns & Crain, Ltd.

(57) ABSTRACT

A fairing for an aircraft is disclosed in which the fairing comprises a first fairing portion configured to be fixedly attached to a first structural component and having a first edge; a second fairing portion configured to be fixedly attached to a second structural component and having a second edge, wherein the first edge and the second edge define an interface configured to enable relative movement between the first fairing portion and the second fairing portion.

18 Claims, 20 Drawing Sheets

(56) References Cited

U.S. PATENT DOCUMENTS

| | | | |
|---|---|---|---|
| 9,199,717 B2* | 12/2015 | Bogiatzis | B64C 7/00 |
| 2009/0014117 A1 | 1/2009 | Sauermann | |
| 2010/0077612 A1 | 4/2010 | Tudor et al. | |
| 2017/0274977 A1* | 9/2017 | Zhang | B64C 7/00 |

* cited by examiner

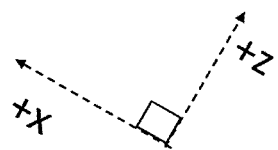
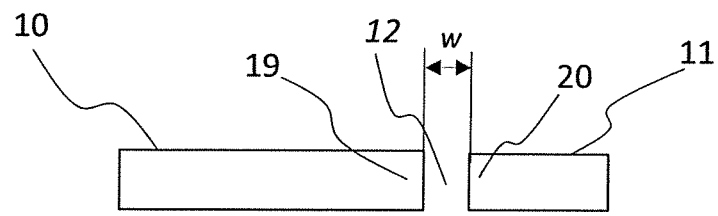
FIG 6A
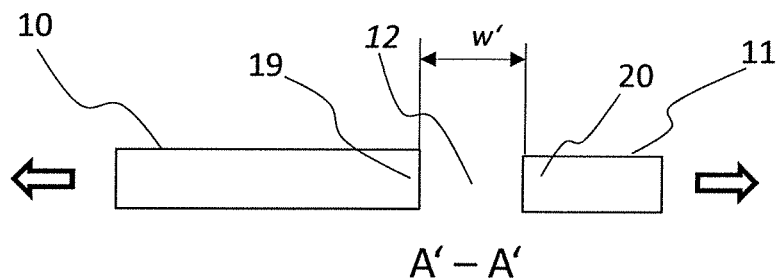
FIG 6B
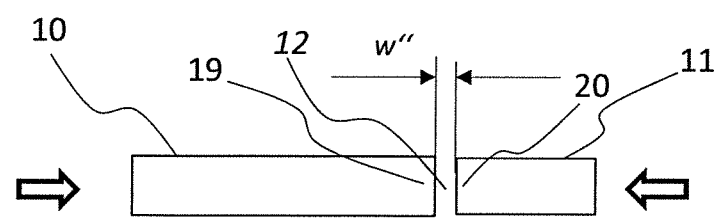
FIG 6C

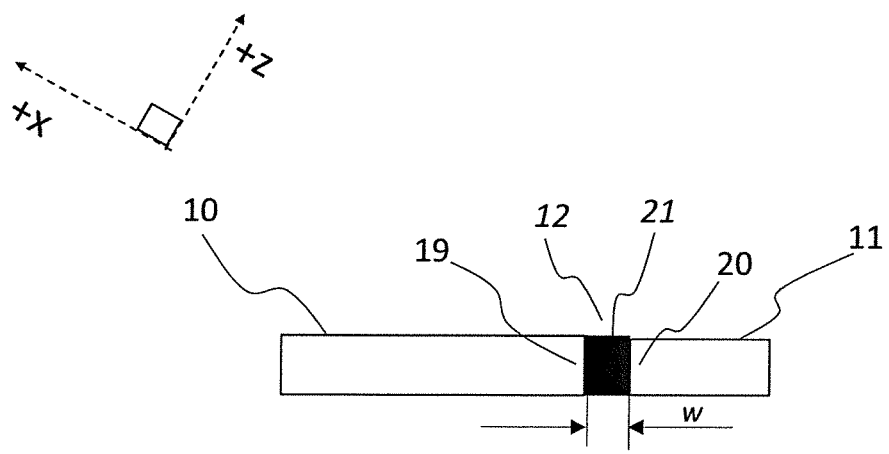
FIG 7A  A - A
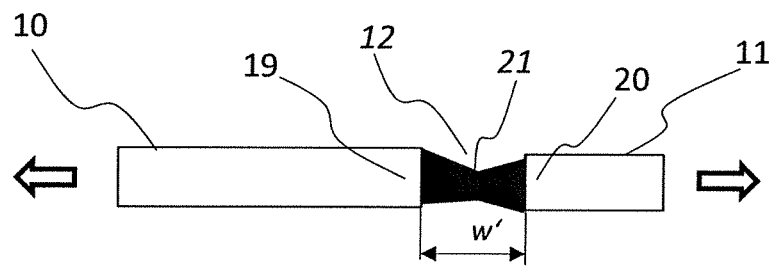
FIG 7B  A' – A'
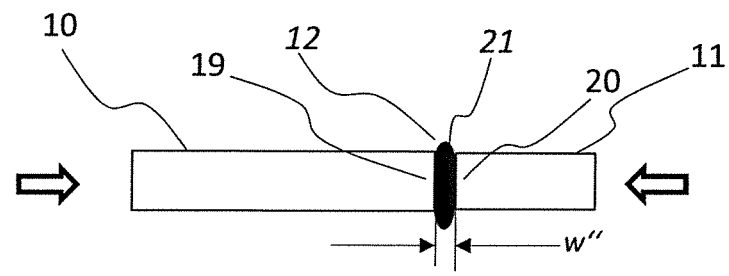
A'' – A''
FIG 7C

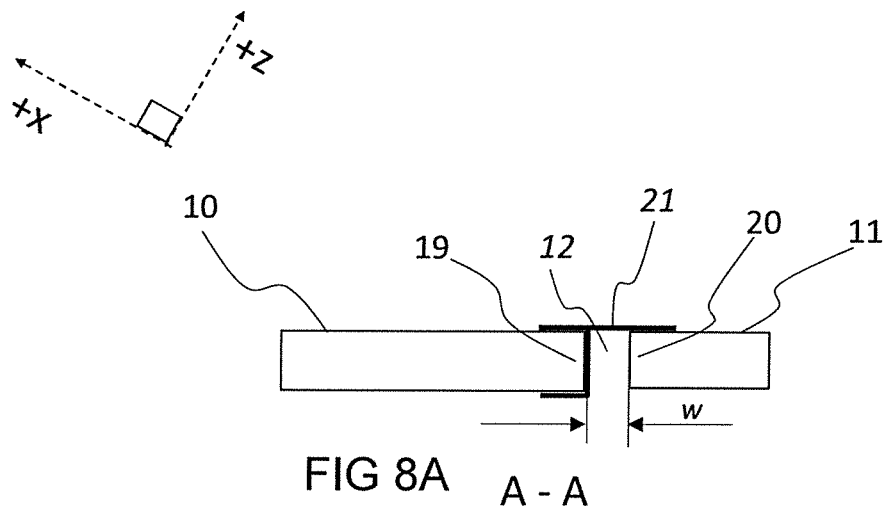
FIG 8A  A - A
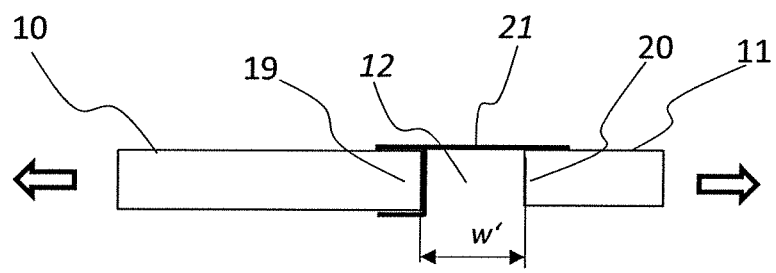
FIG 8B  A' - A'
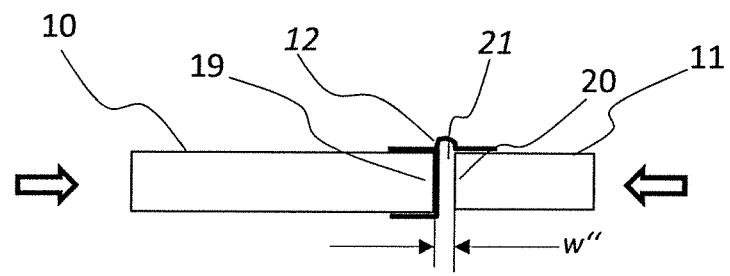
FIG 8C  A" - A"

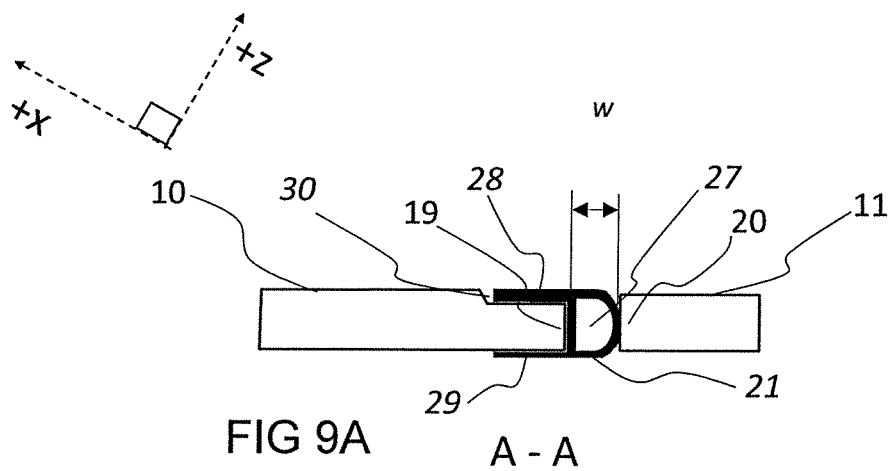
FIG 9A    A - A
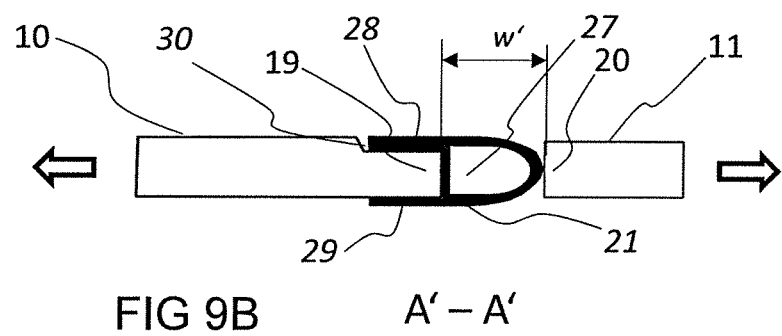
FIG 9B    A' – A'
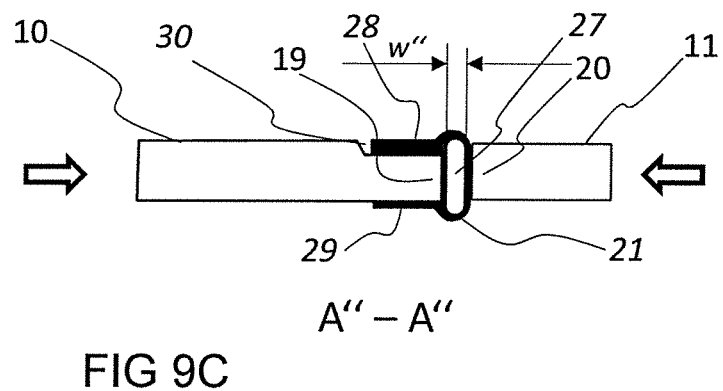
A" – A"
FIG 9C

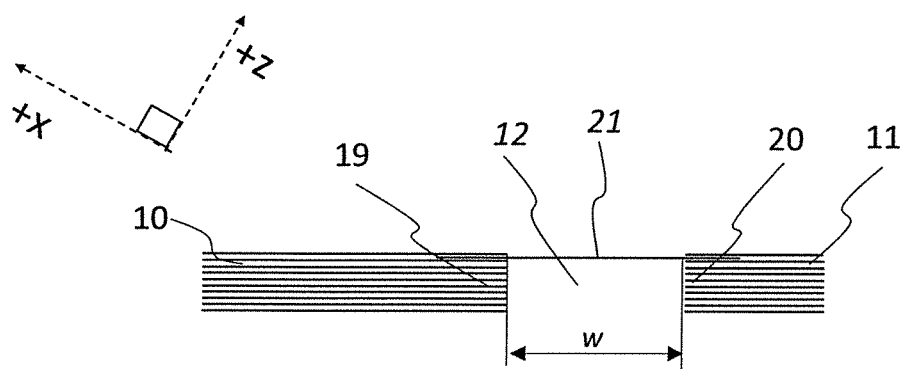
FIG 13A    G - G
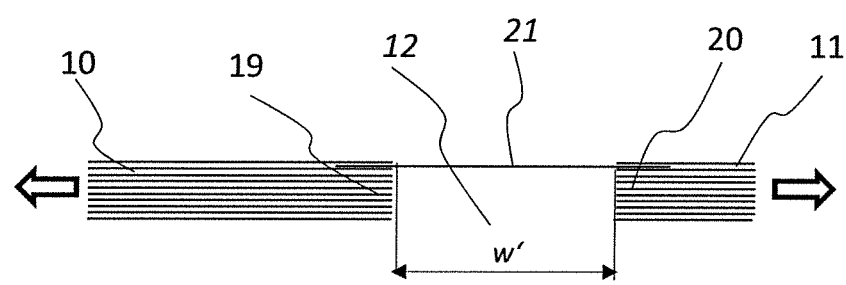
FIG 13B    G' – G'
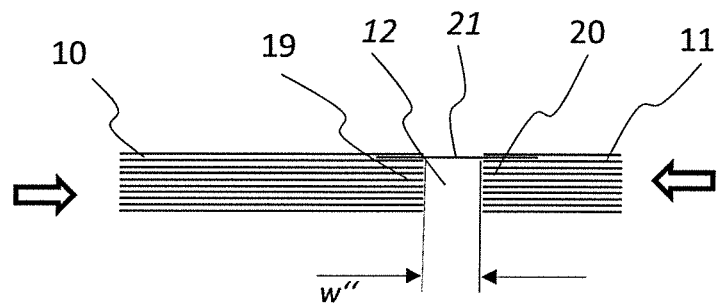
FIG 13C    G'' – G''

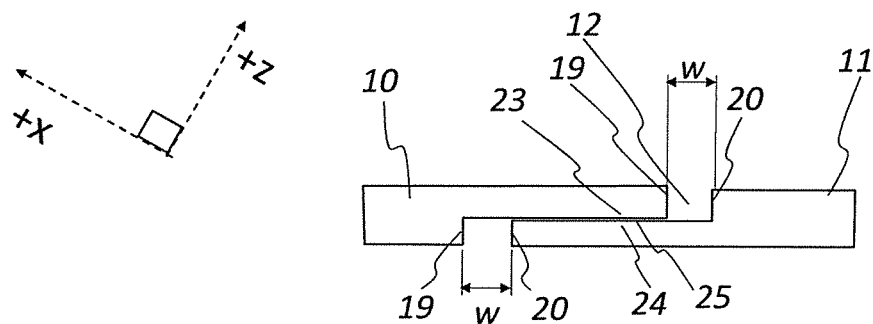
FIG 14A   A - A
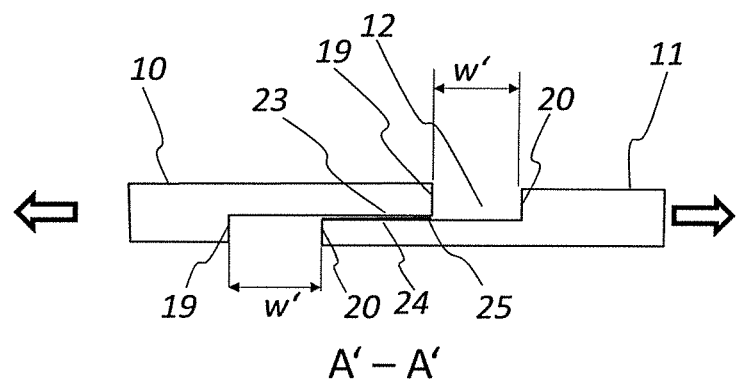
FIG 14B   A' – A'
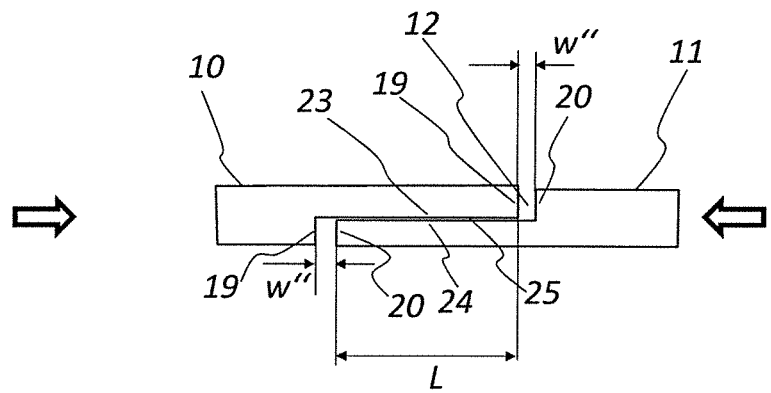
FIG 14C   A" – A"

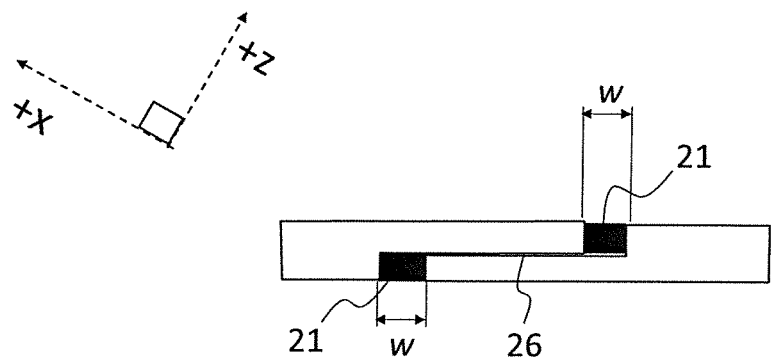
FIG 15A   A - A
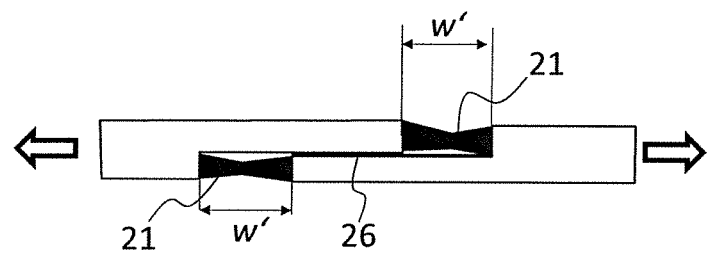
FIG 15B   A' – A'
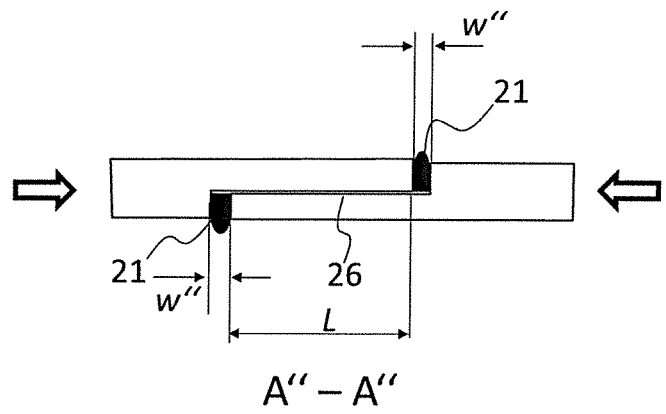
A'' – A''
FIG 15C

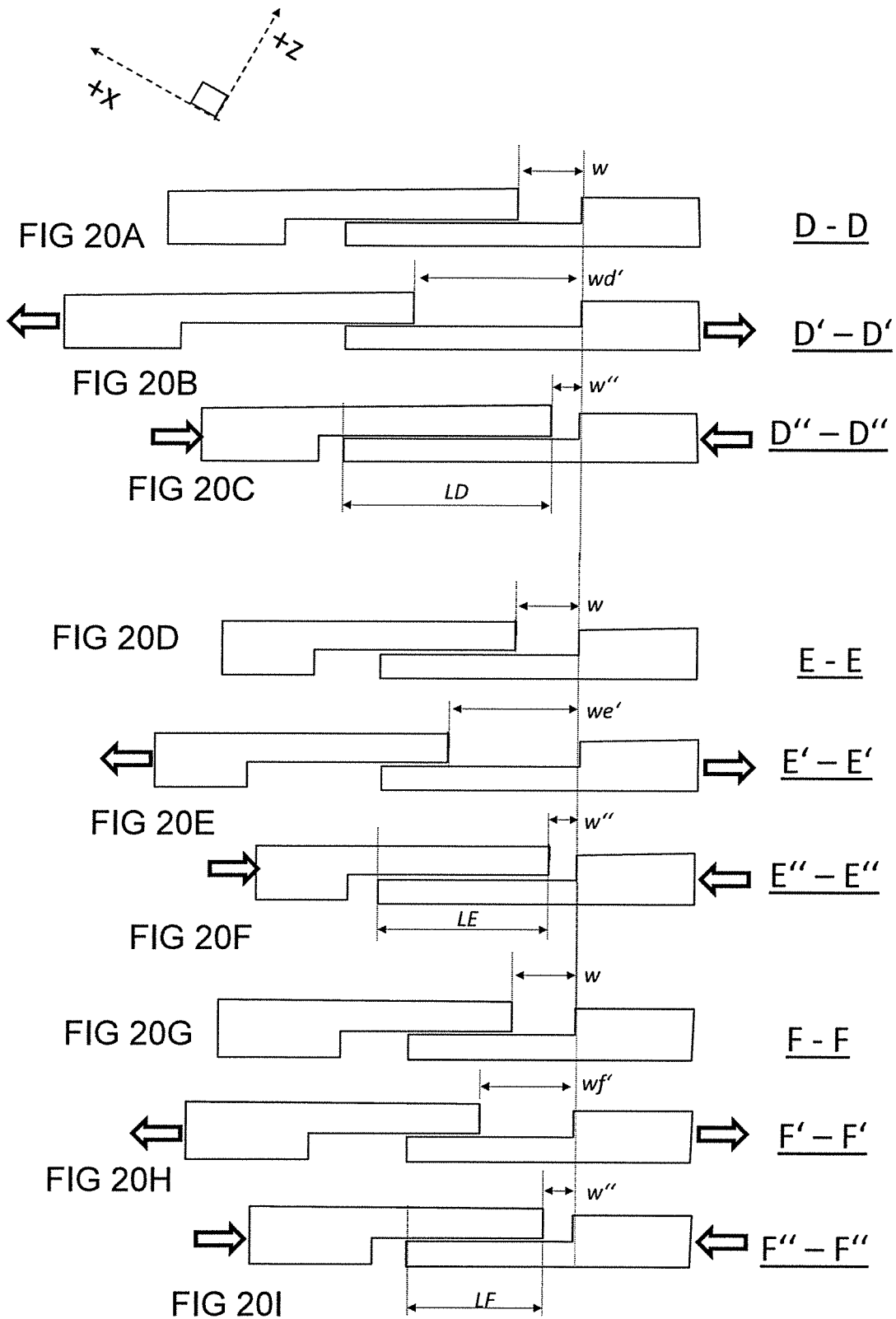

FAIRING FOR AN AIRCRAFT

CROSS-REFERENCES TO RELATED APPLICATIONS

This application claims the benefit of the European patent application No. 16196833.4 filed on Nov. 2, 2016, the entire disclosures of which are incorporated herein by way of reference.

BACKGROUND OF THE INVENTION

The present technology relates to a fairing for an aircraft.

A fairing is a structure typically used for aircraft to covers gaps or spaces between structural components of an aircraft, for example between regions of the fuselage and the wing and/or the vertical and horizontal tail. Their primary purpose is to provide a smooth aerodynamic surface over the gaps and spaces that would otherwise occur in these regions, so that the airflow in the region is altered in a way to reduce overall aerodynamic drag.

They are typically formed as single unitary components of composite material construction that are attached to surrounding structural components with attachment assemblies.

The attachment assemblies typically comprise any combination of buttstraps, L or T shaped profiles, and support frames that are fastened together using mechanical fasteners to the surrounding structural components.

The mechanical design of a fairing and its attachment assemblies must take into account load cases that are estimated by the designer. Some estimated loads cases are important to the main function of the fairing itself, i.e., providing a structurally rigid and smooth airflow surface for the loads to be expected during operation of the aircraft. Other load cases are what are termed as "critical" because they determine the structural integrity of the overall design, which must be sufficient to withstand these critical load cases without any unacceptable failure occurring. Being able to demonstrate that a given fairing design structurally survives such critical load cases is essential to certification of the design and of the aircraft.

The critical loads cases for a fairing normally take place when the design comprises a single unitary fairing body that is fixedly attached by attachment assemblies between a first structural component, for example the fuselage, and a second structural component, for example the vertical tail, and when relative displacement between the structural components are at a maximum and/or minimum. These types of loads can be relatively high and are typically referred to as induced loads due to fact that the fairing body and its attachment assemblies form a load path between the structural components. In these critical loads cases, the unitary fairing body and its attachment assemblies must have sufficient strength and stiffness to cope with instances of high induced loads, for example: tensile, compression, bending, torsion or bypass loads. The critical load cases may dominate the overall design of a unitary fairing body and its attachment assemblies. Designing a fairing according to the above described design philosophy typically leads to a fairing with large part thicknesses, high part counts and the use of high performance material such as titanium or steel fasteners in combination with the use of a unitary carbon fiber composite sandwich fairing component. Ultimately, this leads to a conservative design that overall is heavy, as well as complex and expensive to design and manufacture.

SUMMARY OF THE INVENTION

An embodiment of the present technology provides a fairing for an aircraft, wherein the fairing comprises a first fairing portion configured to be fixedly attached to a first structural component and having a first edge; a second fairing portion configured to be fixedly attached to a second structural component and having a second edge, wherein the first edge and the second edge define an interface configured to enable relative movement between the first fairing portion and the second fairing portion.

The interface is configured to prevent loads being transferred through the fairing due to relative movement between the first structural component and second structural component. Such an interface allows for a fairing wherein the overall design of the fairing is not governed by critical loads cases relating to the maximum and minimum relative displacement of the first and second structural components, but is rather instead governed by only aerodynamic loading of the fairing.

As the fairing and its corresponding attachment assembly are designed to a lower load level compared to other solutions, the resulting design will have a reduced component part count and weight due to less profiles, buttstraps and mechanical fasteners. It also results in a lower cost to manufacture due to the use of less exotic materials that have a lower mechanical performance requirement.

In a further embodiment, the interface is provided with at least one seal. A function of the seal is to prevent fluid such as water, contaminants such a hydraulic fluid or debris such as dust, insects, or ash, from transitioning through the interface to the interior the fairing.

The seal can also provide a smooth uninterrupted exterior surface of the fairing between the first and second fairing portions, so as to prevent any unwanted aerodynamic flow separation or aero-acoustic phenomena.

The seal may be formed of a resilient material which ensures that deflection loads are not transferred from the first fairing portion to the second fairing portion and vice versa through the seal. The seal may further comprise a deformable cavity. The seal may be formed from a resilient material that is reinforced.

In a further embodiment, the seal is provided by a resilient sealing material that is applied to the interface before or after final assembly of the fairing to the aircraft's first and/or second structural components.

In another embodiment, the seal is provided by at least one ply of resilient material, that is, an outer, inner or intermediate ply attached to the first fairing portion and the second fairing portion.

Having an interface further provided with at least one seal formed using a ply of resilient material may be preferable when a seal design that is less prone to edge erosion is required. Furthermore, such an arrangement may also provide an interface where less deformation of the seal occurs during operation, which will result in an even smoother aerodynamic surface between the first and second fairing portions.

In a further embodiment, the fairing may comprise an interface that is an overlapping type of interface defined by overlapping corresponding edges of the first fairing portion and second fairing portion when they are fixedly attached to the first structural component and second structural component, respectively. Such an interface may provide an improved structural arrangement such that aerodynamic pressure loads acting normal to the surface of the fairing may be distributed more evenly between the first and second portions of the fairing, while still ensuring that induced loads due to relative movement between the first and second structural components are minimized or avoided entirely.

In another embodiment, the interface that is defined by overlapping corresponding edges further comprises at least one seal, configured to further prevent contaminant ingress transitioning through the interface.

Such an interface may, in addition or alternatively, be provided with a friction reducing coating and/or part configured to reduce friction between the edge of the first fairing portion and the corresponding edge of the second fairing portion when the aerodynamic fairing is in use. This may reduce mechanical wear of the fairing during its service life, therefore reducing the need for removal of the fairing from the aircraft for maintenance or repair.

In a further embodiment, the friction reducing coating is provided by a Teflon® (polytetrafluoroetheylene) coating applied to the overlapping surfaces of the first fairing portion and the second fairing portion.

In another embodiment, the fairing comprises an interface with a maximum overlap dimension that varies along the length of the interface so as to take into account differences of expected displacement when the aerodynamic fairing is in use. Defining an interface in such a way may provide optimum dimensions of the interface during critical loads cases where the magnitudes of the interface gap dimensions are expected to be at a minimum and at a maximum. At a minimum interface gap dimension, it is preferred that the edges of the first and second fairing portions do not contact one another so as to cause structural damage and transfer of displacement induced loads through the interface. At cruise conditions, it may be preferable that the interface gap dimensions are continuous along the length of the interface. At a maximum interface gap dimension, it may be preferable to ensure that that edges of the first and second fairing portions maintain an overlap along the length of the interface, so as to maintain even distribution of aerodynamic pressure loads between the first and second fairing portions, and or to maintain a seal arrangement substantially between the exterior and interior of the fairing and/or to maintain aerodynamic and aero-acoustic performance of the fairing by providing a smooth aerodynamic surface between the first and second fairing portions.

The first structural component may be a fuselage of an aircraft. The second structural component may be the vertical tail of an aircraft. Displacement between the vertical tail and the fuselage in critical load cases are typically of a magnitude well suited to the application of an aerodynamic fairing designed according to any embodiment described.

However it will be appreciated by the skilled person that either component may comprise any other suitable arrangement of structural components located adjacent to one another where induced load transfer would need to be avoided. For example, aerodynamic fairings so far described may also preferably be used where the first structural component is a fuselage of the aircraft and the second structural component is a wing of an aircraft. Displacement between the wing and the fuselage in critical load cases are also typically of a magnitude well suited to the application of an aerodynamic fairing designed according to any embodiment described. Further benefits and advantages of the present invention will become apparent from the detailed description with appropriate reference to the accompanying drawings.

BRIEF DESCRIPTION OF THE DRAWINGS

FIGS. 6A-6C show cross-sectional representations of a gap between fairing portions of the fairing of FIGS. 2 and 4-5 under different load conditions.

FIGS. 7A-C show a first type of seal provided in the gap of FIGS. 6A-6C.

FIGS. 8A-C show a second type of seal provided in the gap of FIGS. 6A-6C.

FIGS. 9A-C show a third type of seal provided in the gap of FIGS. 6A-6C.

FIG. 13A-C show cross-sectional representations of a gap between fairing portions of the fairing of FIGS. 10-12 under different load conditions.

FIGS. 14A-C show cross-sectional representations of a second embodiment of a fairing of FIG. 2 under different load conditions.

FIGS. 15A-C show a first type of seal provided in the gap of FIGS. 14A-14C.

FIGS. 20A-20I show side-sectional representations of a gap between fairing portions of the fairing of FIG. 16 at different locations and under different load conditions.

DETAILED DESCRIPTION OF THE PREFERRED EMBODIMENTS

Figure 1:
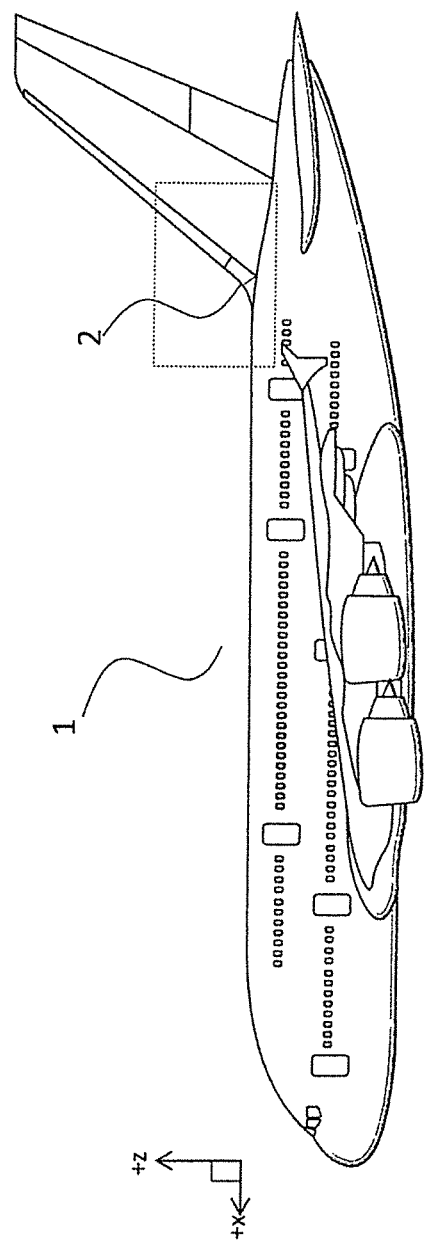
FIG. 1 shows a side elevational view of an aircraft with a fairing embodying the principles of the present invention.

FIG. 1 shows a left-hand side view of an aircraft 1 comprising a type of fairing 2 according to a first embodiment of the present invention. The aircraft 1 is shown in flight in steady and level flight, i.e., during cruise phase of flight. FIG. 1 also provides a set of orthogonal axes which represent the aircraft longitudinal axis (X) and vertical axis (Z). The orthogonal aircraft lateral axis or spanwise axis (Y) is shown in more detail in FIG. 3.

Figure 2:
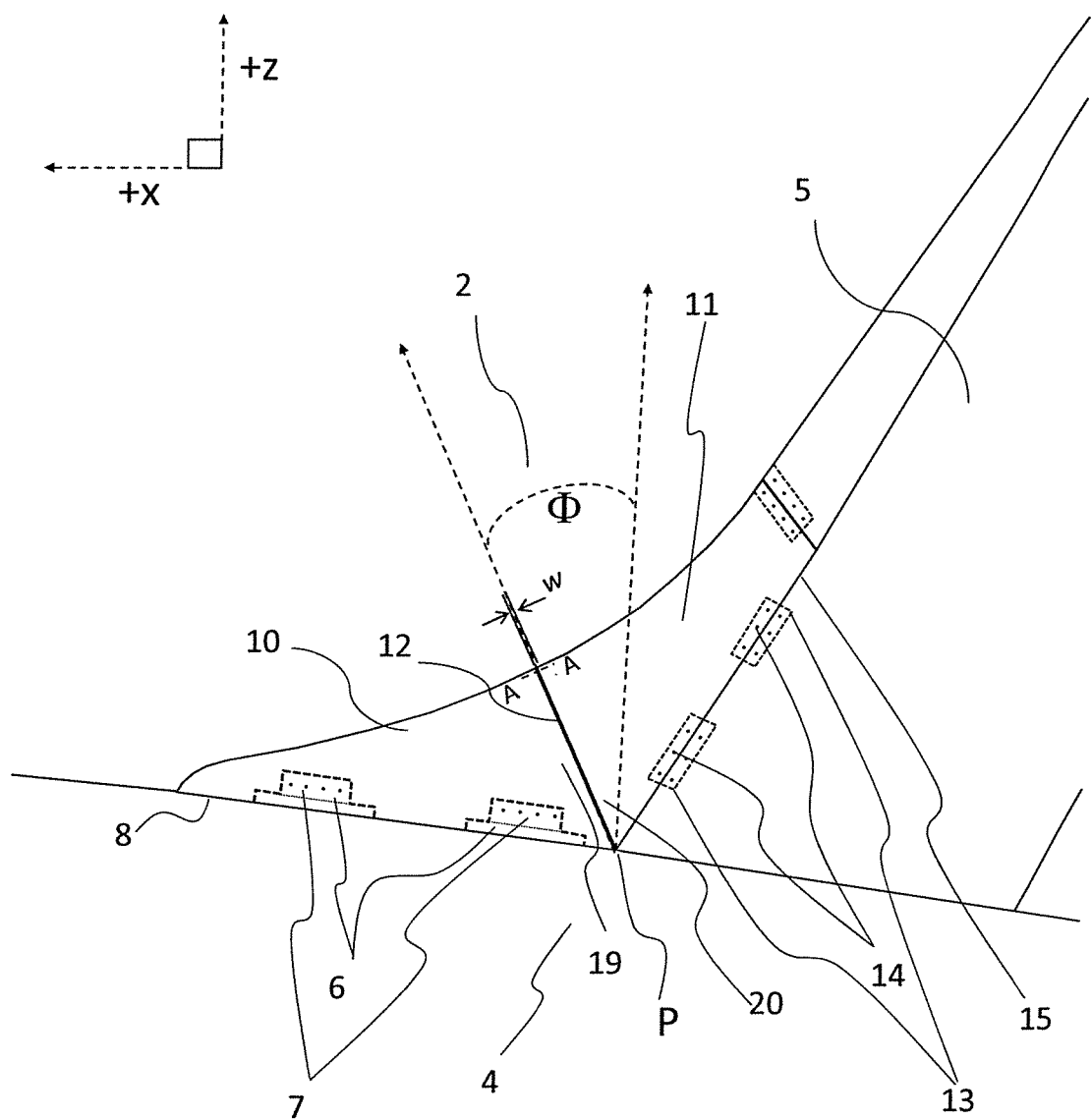
FIG. 2 shows a side elevational view of a portion of the aircraft of FIG. 1, in the area of a fairing embodying the principles of the present invention.

FIG. 2 shows a close-up left-hand side view of the fairing 2 and surrounding structure of FIG. 1 also with hidden detail that shows the attachment assemblies used to attach the fairing 2 to the surrounding structural components 4 and 5.

Figure 3:
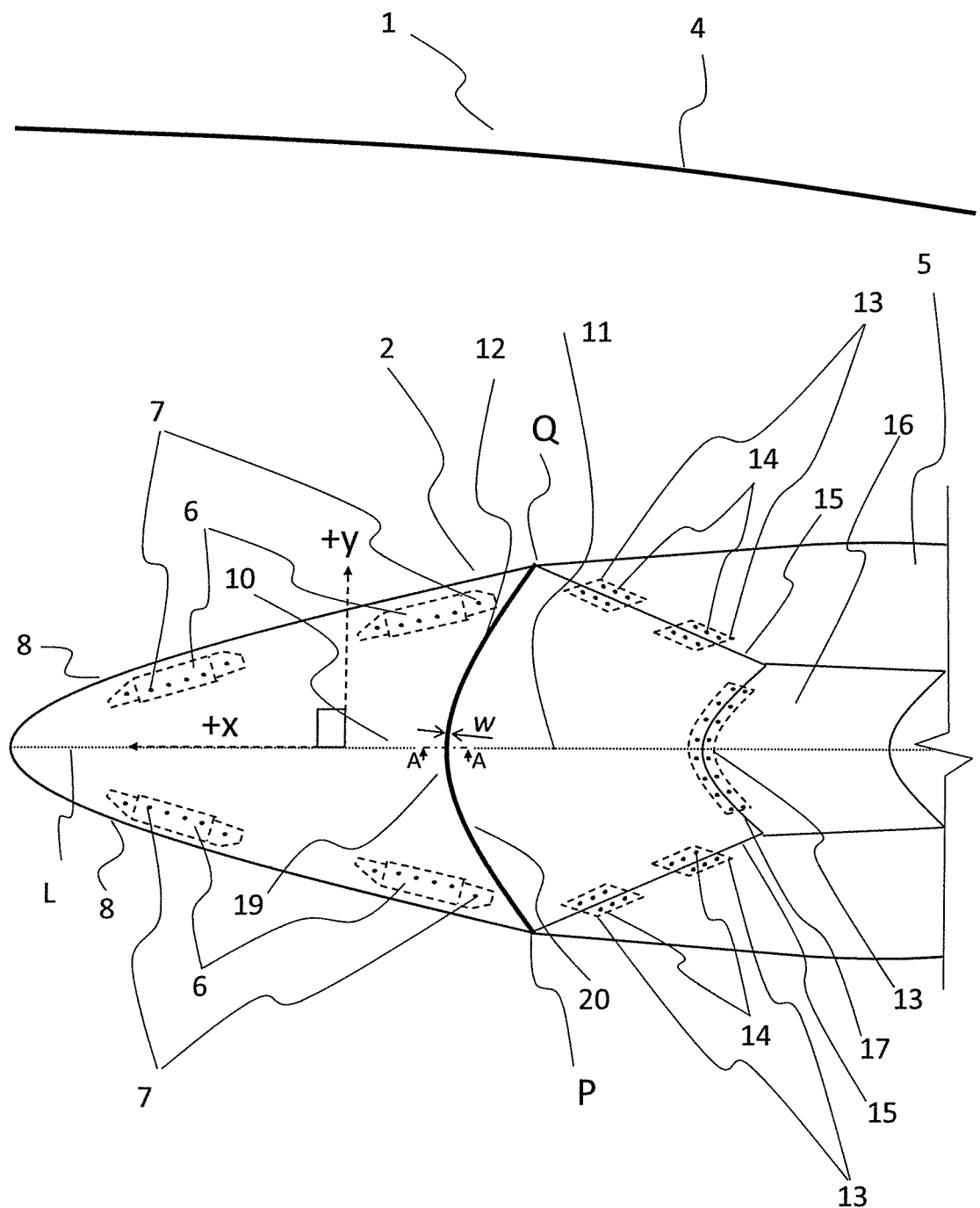
FIG. 3 shows a plan view of the fairing of FIG. 2.

FIG. 3 shows a plan view of the fairing 2 of FIG. 2, again with the same hidden detail. It is shown also that the fairing 2 is symmetrical through a local fairing vertical plane lying on the aircraft X-Z plane.

From FIGS. 2 and 3, it is shown that the main body of the fairing 2 is composed of two substantially separate portions; a first portion 10 positioned forward of (i.e., positive X direction), and in close proximity to, a second portion 11. Both the first and second portions 10 and 11 are positioned between a leading-edge junction region of a first structural component 4, that in this present embodiment is the upper surface region of the aft fuselage, and a second structural component 5, that in this present embodiment is lower leading edge region of the vertical tail of the aircraft 1.

The first fairing portion 10 is fixedly attached to the fuselage 4 via a first set of L shaped aluminum profiles 6 and corresponding rows of mechanical fasteners 7. The profiles 6 are fixedly attached to both the outer skin of fuselage 4 in four positions and to corresponding four positions on the first fairing portion 10 adjacent to its lower peripheral edge 8. The profiles 6 and corresponding mechanical fasteners are considered to be the first attachment assembly 9.

Similarly, the second fairing portion 11 is fixedly attached to the vertical tail 5 via a set of five buttstraps 13 and corresponding rows of mechanical fasteners 14. Four out of five buttstraps are fixedly attached to both the leading edge of the vertical tail 5 in four positions and to four corresponding positions along the peripheral trailing edge 15 of the second fairing portion 11. A further fifth curved buttstrap 13 is fixedly attached to both a lower leading-edge element 16 of the vertical tail and the upper peripheral edge 17 of the second fairing portion 11. The fifth buttstrap 13 and corresponding mechanical fasteners 14 are considered to be a second attachment assembly 18.

An interface 12 is formed between an aft peripheral edge 19 of the first fairing portion 10 that is set apart from a foremost peripheral edge 20 of the second fairing portion 11, which edges are opposite to one another when the first fairing portion 10 and second fairing portion 11 are installed on the aircraft 1 In the cruise condition of FIGS. 1 to 3, the interface 12 comprises a gap of dimension w defined between the edges 19 and 20 of the first and second fairing portions 10 and 11, respectively.

The first and second fairing portions 10 and 11 are both formed as lightweight composite sandwich components, each incorporating a cured layup of non-metallic, lightweight structural NOMEX Honeycomb core, in combination with GFRP prepreg laminate plies (not shown). The plies are a balanced layup of woven prepreg laminate plies which are cured as an assembly in an autoclave. The first and second fairing portions 10, 11 are manufactured as separate components. The honeycomb core does not extend in the layup to the peripheral edges 8, 19, 20, 15, 17, of each portion 10 and 11, i.e., the edges 19 and 20 are formed of monolithic layups of GFRP plies.

Alternatively, unidirectional prepreg or dry fibers may be used in the design. CFRP prepreg or any other suitable combination of material may be used for the laminate plies. Furthermore, a foam core such as ROHACELL® foam core may be used as an alternative to the honeycomb core, or any other suitable stiffening means may be used such as integrally or separately attached stringers formed of composite or metallic material.

The first and second fairing portions 10 and 11 may alternatively be substantially formed of a metallic alloy such as aluminum alloy. The portions 10 and 11 may be manufactured from sheet material using any suitable operation such as superplastic forming, shot-peen forming or alternatively formed using casting, additive layer manufacture or by milling from a single forged billet.

From FIG. 2 and FIG. 3, it should be understood that the leading-edge region and fuselage are highly curved so the fairing 2 and thus the interface 12 takes the form of a complex 3D curve, which, in FIG. 2 is represented by a straight 2D curve where the 3D curve is shown projected onto an X-Z plane defined by orthogonal aircraft axes X and Z. From FIG. 2, it is shown that the interface 12 bifurcates the fairing 2 into a first portion 10 and second portion 11 at an angle Φ equal to approximately 20 degrees from the Z vertical. The interface 12 starts and ends at points P and Q, respectively as shown in FIG. 3.

It should be appreciated that parameters such as the sweep, leading edge curvature and thickness of the vertical tail 5, diameter of the fuselage section 4 may affect the optimal position of the interface 12, which may be represented by any curve at any angle Φ starting at any position along the lower peripheral edges 15 and 8 of the fairing, however it is preferred that the curve defines the fairing 2 into two approximately equally sized portions 10 and 11 capable of providing aerodynamic and structural benefits so far described.

Figure 4:
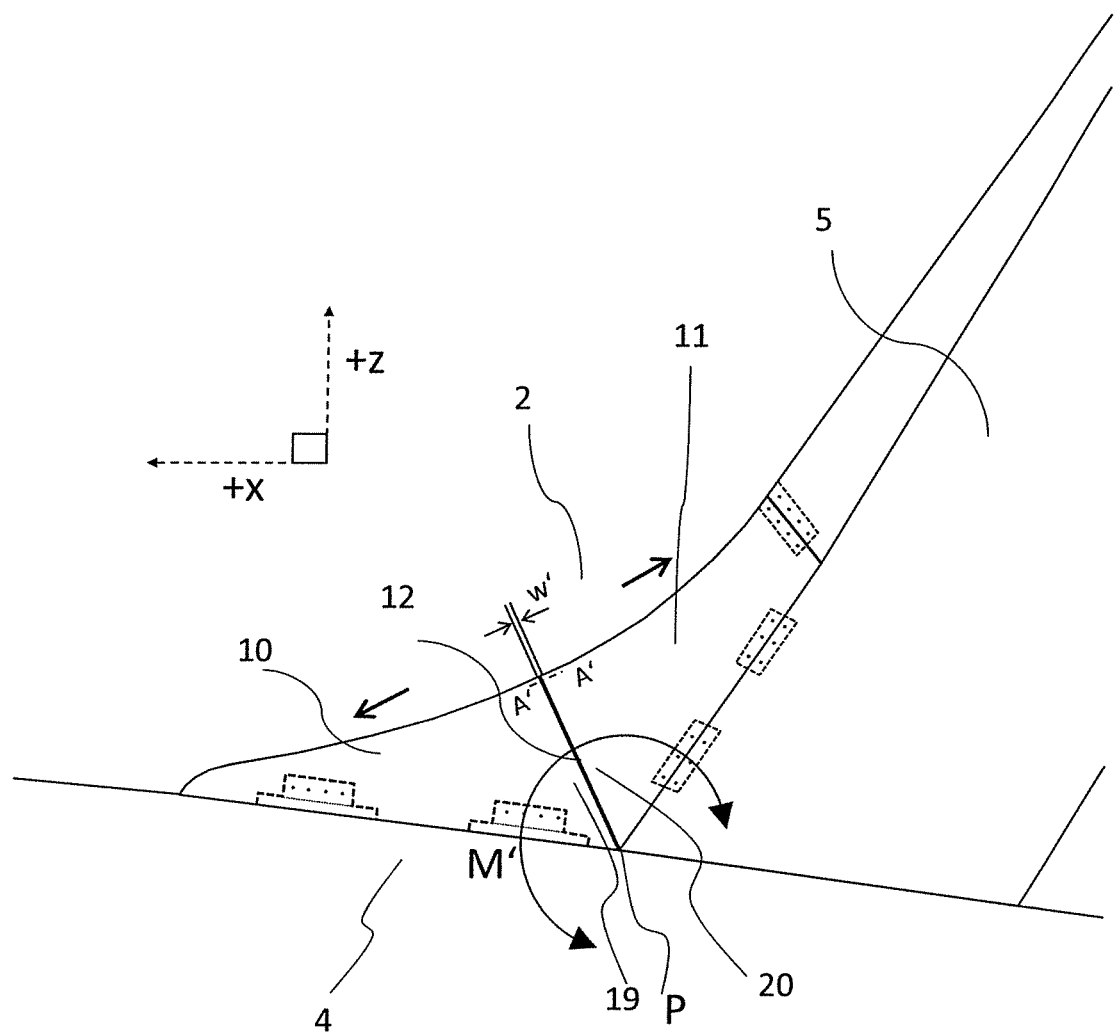
FIG. 4 shows a side elevational view of the fairing of FIG. 2 under a first load condition.

FIG. 4 shows a further close-up left hand side view of the same aircraft 1 of FIGS. 1, 2 and 3, except each that the aircraft 1 in this instance undergoes a first critical load case whereby the fuselage 4 and vertical tail 5 are subject to a bending moment M' in the X-Z plane, such that both structural components are deflected away from each other to a maximum permissible amount. The first fairing portion 10 and second fairing portion 11 are, as a result, displaced away from each other in the direction indicated by the opposing arrows, such that the interface 12 has gap dimension w', which is greater than the dimension w, present in the cruise condition of FIGS. 2 to 3.

Figure 5:
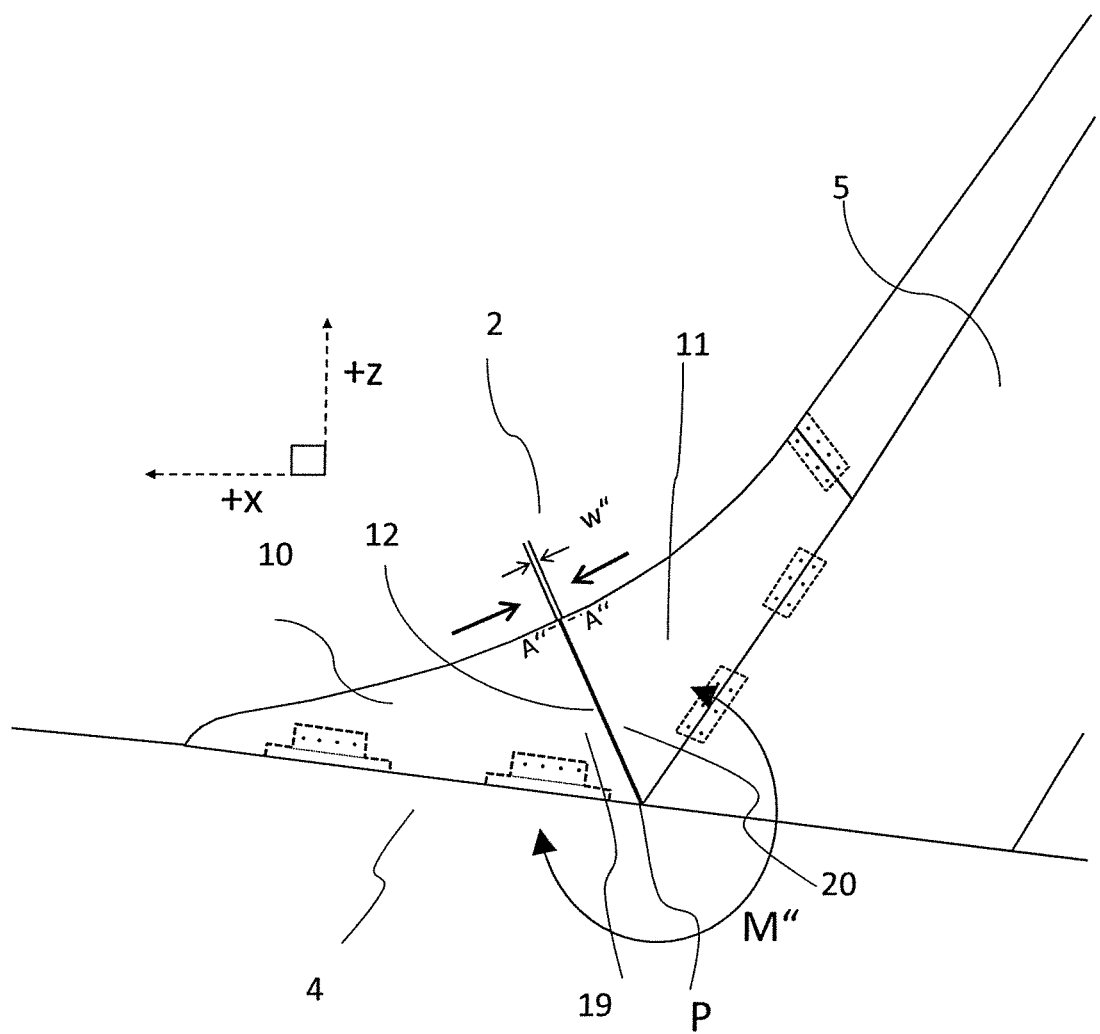
FIG. 5 shows a side elevational view of the fairing of FIG. 2 under a second load condition.

FIG. 5 shows a yet a further close-up left hand side view of the same aircraft 1 of FIGS. 1, 2 and 3, except each that the aircraft 1 in this scenario experiences a second critical load case, whereby the fuselage 4 and vertical tail 5 are subject to a bending moment M", in the X-Z plane, such that both are displaced towards each other to a maximum permissible amount. The first fairing portion 10 and second fairing portion 11 are displaced towards each other in the direction indicated by the opposing arrows such that the interface 12 has a gap dimension w", which is less than the gap dimension w, present in the cruise condition of FIGS. 2 to 3.

FIGS. 6A, 6B and 6C show three cross-sections taken normal at the locations shown through the surface of the fairing 2 at different load cases, i.e., the fairings shown in FIGS. 2 to 5. Section A-A of FIG. 6A represents a cross-section of the interface 12 during the cruise phase of flight wherein the interface 12 comprises a substantially continuous gap dimension w defined between the edges 19 and 20 along their length of the first and second fairing portions 10 and 11 respectively. Preferably w should be no greater than 6 mm in cruise.

Section A'-A' of FIG. 6B represents a cross-section of the interface 12 during the first critical load case of FIG. 4 whereby the first fairing portion 10 and second fairing portion 11 are displaced away from each other by a maximum amount and wherein the interface 12 comprises a gap dimension w' in the same manner of the preceding paragraph. Preferably w' should be no greater than 10 mm during the first critical load case.

Similarly, section A"-A" of FIG. 6C represents a cross-section of the interface 12 during a second critical load case of FIG. 5 whereby the first fairing portion 10 and second fairing portion 11 are displaced towards each other by a maximum amount and wherein the interface 12 comprises a gap dimension w" in the same manner of the preceding paragraph. Preferably w" should be no greater than 2 mm during the second critical load case.

FIGS. 7A, 7B and 7C show a further embodiment to the one shown in FIGS. 1 to 6A-6C, wherein the interface 12 is provided with a seal 21. The seal 21 is formed of a formed by a resilient two-part curable sealing material such as 3M™ Aerospace Sealant AC-250 that is sufficiently elastic so as to ensure that no significant load is transferred from the first fairing portion 10 to the second fairing portion 11, or vice versa, due to relative movement of the first structural component 4 and second structural component 5 when the fairing 2 is in use. The seal 21 is applied and formed to the interface 12 before attachment of the first fairing portion 10 and second fairing portion 11 to the aircraft's fuselage 4 and vertical tail 5. This may be achieved by temporarily attaching the first portion 10 and second portion 11 to a jig that holds the portions 10 and 11 relative to each other in the expected cruise position and then applying the curable sealant. It may alternatively be applied when the fairing portions 10 and 11 are fixedly attached to the fuselage 4 and vertical tail 5 of the aircraft. The interface 12 may be provided with a seal 21 that is substantially continuous along the length of the interface 12, or it may be provided with multiple seals 21.

FIGS. 8A-8C provide an alternative embodiment of a seal 21 of predetermined dimensions formed from a fabric reinforced resilient material. The seal 21, is bonded using an aerospace grade adhesive to the upper surface of the first and second fairing portions 10 11 and it covers the interface 12. The seal 21 also extends around the edge 19 to the lower surface of the first fairing portion 10 and is bonded to the lower surface also. This ensures that the if the bond to the upper surface of the first fairing portion 10 fails, there will be sufficient bond remaining on the lower surface to ensure that the seal 21 does not come away from the fairing 2 due to aerodynamic forces acting on the seal 21 in flight. Such a seal may also be installed by any other means such as by fastening to the edges 19 and 20 of the first and second fairing portions 10, 11 before or after the interface 12 is formed. The seal 21 may alternatively only be bonded to the first fairing portion 10.

FIGS. 9A-9C provide yet another embodiment of a seal 21 of predetermined dimensions formed from a fabric reinforced resilient material. The seal 21 further comprises a deformable cavity 27 and two leg portions 28 and 29 which are bonded the upper and lower surfaces of only the first fairing portion 10 using an aerospace grade adhesive. A seal 21 with a deformable cavity 27 may be preferable where the magnitudes of deflection between the first and second portions 10 and 11 are substantial. The upper surface of the first fairing portion 10 comprises a recess 30 to which the first leg portion 28 is bonded. Such an arrangement is further advantageous in that a seal 21 need only be applied to a single fairing portion, which will lead to simplification of design and increased ease of maintenance and repairability. It should be appreciated that the seal 21 may only comprise one of the legs and therefore be substantially P-shaped. Furthermore, such a seal may be installed by any other means such as by fastening to the edge 19 of the first fairing portion 10 before or after the interface 12 is formed.

The respective types of seal 21 of FIGS. 7A-C, 8A-C and 9A-C resiliently deform accordingly to gap dimensions w, w' and w". It should be noted that while the seal 21 in each case deforms resiliently for all ranges of deflection between the first and second fairing portions 10 and 11, it retains its integrity and should not rupture. Furthermore, it should be noted that the seals are configured to provide an optimal aerodynamic profile in cruise where the gap dimension is w.

Figure 10:
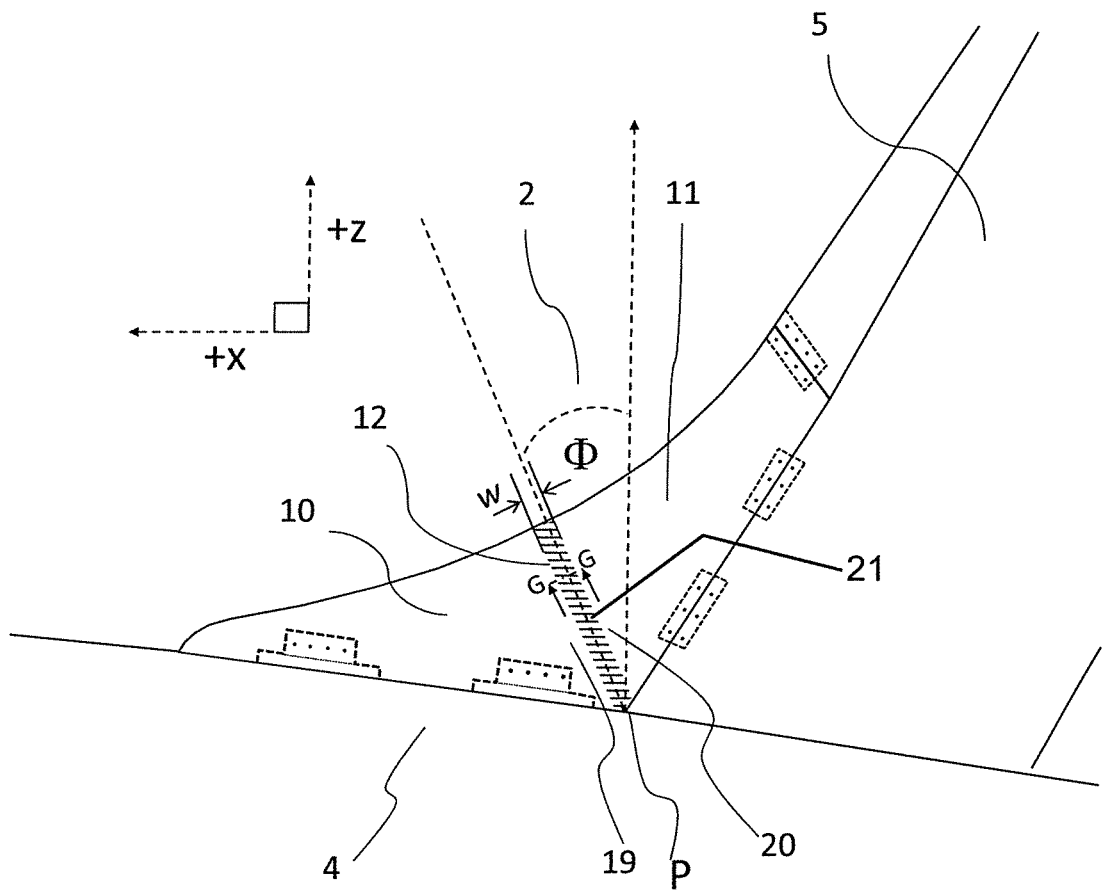
FIG. 10 shows a fourth type of seal for the fairing of FIG. 2.

FIG. 10 shows yet a further embodiment of the present invention. A close-up left-hand side view of the same aircraft 1 of FIG. 1 is shown in flight in steady and level flight, i.e., during cruise phase of flight.

In the embodiment of FIG. 10, the first and second portions 10 and 11 are formed substantially the same as that of previous embodiments, however the seal 21 is instead provided by at least one ply of resilient material that is an intermediate ply in the layup of the monolithic plies of GFRP of both the first and section fairing portion edges 19 and 20. Alternatively, the ply may be an outermost or innermost ply of the first and second body portions, adjacent to the interface 12. The ply of resilient material may be co-bonded, secondary bonded, co-cured or adhered or any other suitable means. The resilient material in this example is an isotropic aviation grade rubber. It may also be formed substantially from aviation grade silicone, which is particularly useful for higher temperature applications. Additionally, the resilient material may be reinforced with glass fibers. Other reinforcing materials may also be used, for example polyester woven fabrics and or meshes. The reinforcement may be added to provide a reinforced resilient material that has quasi-isotropic mechanical properties.

Having an interface 12 further provided with seal 21 that is integral with both the first and second fairing portion 10 and 11 may be preferable if a design subject to less edge erosion is required. Furthermore, such an arrangement may also provide an interface 12 where less deformation of the seal 21 occurs during operation, which will result in an even smoother aerodynamic surface between the first and second fairing portions 10 and 11.

Figure 11:
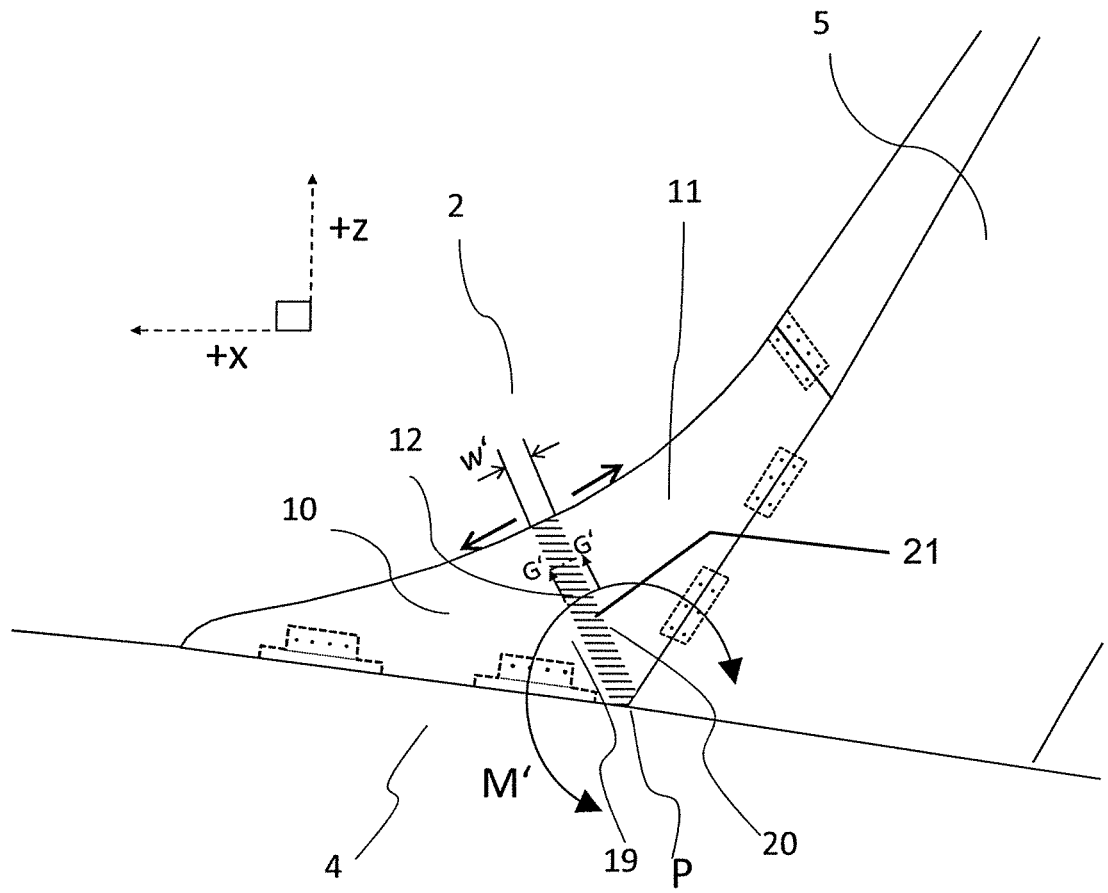
FIG. 11 shows a side elevational view of the fairing of FIG. 10 under a first load condition.

FIG. 11 shows a further close-up left hand side view of the same aircraft 1 of FIG. 10, except that the aircraft 1 in this instance undergoes a first critical load case whereby the fuselage 4 and vertical tail 5 are subject to a bending moment M' such that both are deflected away from each other to a maximum permissible amount. The first fairing portion 10 and second fairing portion 11 are displaced away from each other in the direction indicated by the opposing arrows such that the interface 12 has a gap dimension w', which is greater than the gap dimension w, present in the cruise condition of FIG. 10.

Figure 12:
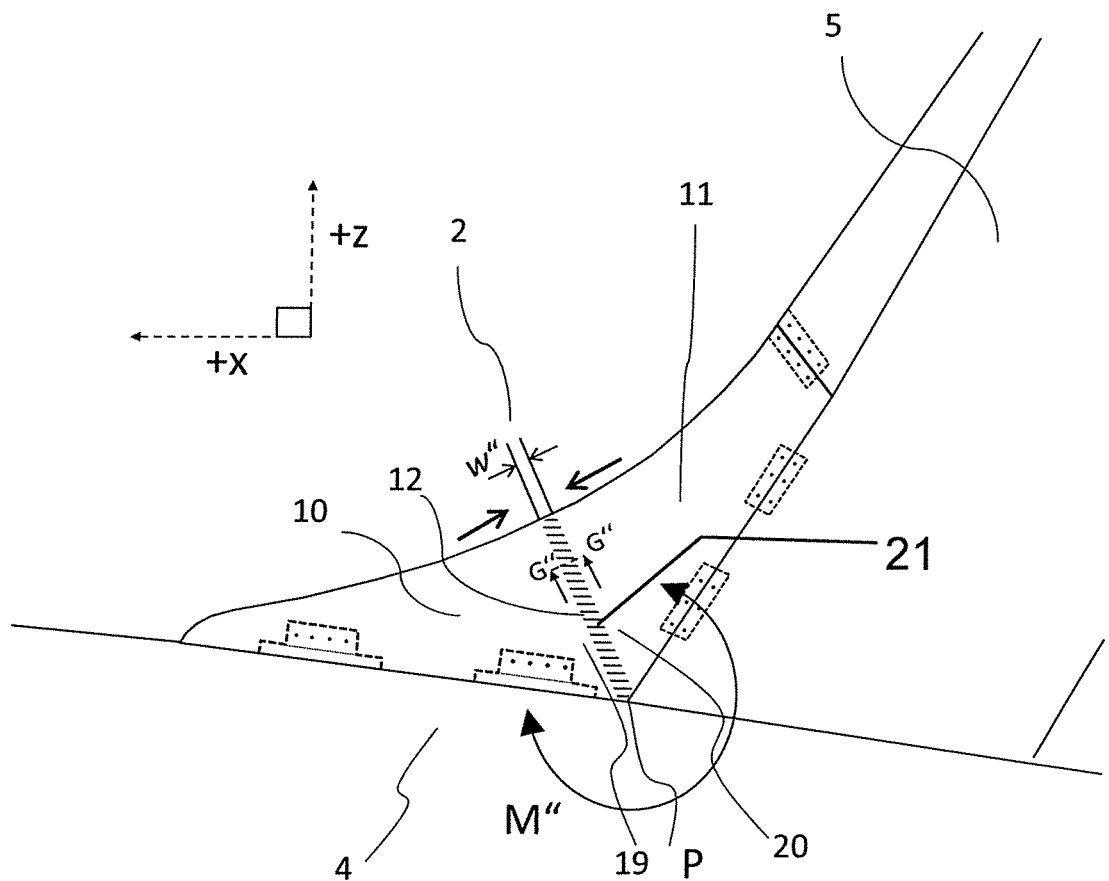
FIG. 12 shows a side elevational view of the fairing of FIG. 10 under a second load condition.

FIG. 12 shows a yet a further close-up left hand side view of the same aircraft 1 of FIG. 10, except each that the aircraft 1 in this scenario experiences a second critical load case whereby the fuselage 4 and vertical tail 5 are subject to a bending moment M" such that both are displaced towards each other to a maximum permissible amount. The first fairing portion 10 and second fairing portion 11 are displaced towards each other in the direction indicated by the opposing arrows such that the interface 12 has a gap dimension w", which is less than the gap dimension w, present in the cruise condition of FIGS. 10 and 11.

FIGS. 13A, 13B and 13C provide three cross-sections taken at the locations and directions shown in FIGS. 10 to 12 through the surface of the fairing 2 at different load cases. Therefore, section G-G of FIG. 13A represents a cross-section of the interface 12 of FIG. 10 during the cruise phase of flight wherein the interface 12 comprises seal 21 formed at least one ply of integrally cured resilient material. A substantially continuous gap dimension w is defined between the edges 19 and 20 along their length of the first and second fairing portions 10 and 11 respectively. Preferably w should be no greater than 6 mm during the second critical load case.

Section G'-G' of FIG. 13B represents a cross-section of the interface 12 during the first critical load case of FIG. 11 whereby the first fairing portion 10 and second fairing portion 11 are displaced away from each other by a maximum amount. The interface 12 comprises a gap dimension w' in the same manner of the preceding paragraph. Preferably w' should be no greater than 10 mm during the first critical load case.

Similarly, section G"-G" of FIG. 13C represents a cross-section of the same interface 12 during a second critical load case of FIG. 12 whereby the first fairing portion 10 and second fairing portion 11 are displaced towards each other by a maximum amount. The interface 12 comprises a gap dimension w" in the same manner of the preceding paragraph. Preferably w" should be no greater than 2 mm during the second critical load case.

In yet another alternative embodiment of the invention previously shown in FIGS. 1 to 5 is provided in FIGS. 14A, 14B and 14C. In this alternative embodiment, the opposing edges 19 and 20 of the first fairing portion 10 and second fairing portion 11 form an overlap when installed on the aircraft such that overlapping surfaces 23 and 24 are defined by the first fairing portion 10 and second fairing portion 11, respectively. The gap dimensions w, w' and w" are provided in substantially same way as the embodiments previously described in FIGS. 1 to 5. A maximum overlap length L is shown in section A"-A", which is a constant value in the embodiment shown.

In the present embodiment, a friction reducing coating 25 provided by a Teflon® coating applied to the upper overlapping surface 23. The purpose of the friction reducing coating 25 is to alleviate any residual friction forces that may occur between the edge 19 of the first fairing portion 10 and the corresponding edge 20 of the second fairing portion 11 when the fairing 2 is in use. The friction reducing coating 25 may be provided by any other suitable material, for example a polyamide material. In addition or alternatively, the seal 21 may be provided with a friction reducing part 26. The part may include at least one corrosion/wear resistant and suitably smooth pad affixed to either or both of the overlapping surfaces 23 and 24 of the first and second fairing portions 10 and 11. This part may be formed of stainless steel or nylon and may, in addition, be coated in Teflon® or any other suitable friction reducing coating 25.

FIGS. 15A, 15B and 15C provide yet another embodiment that is substantially in accordance with the previous embodiment of FIGS. 14A-C. In this further embodiment, the interface 12 that is defined by overlapping corresponding edges 19 and 20 of FIG. 12 and further comprises a seal 21. The seal 21 is formed by a resilient two-part curable sealing material such as 3M™ Aerospace Sealant AC-250 that is applied to the interface 12 before attachment of the first fairing portion 10 and second fairing portion 11 to the aircraft's fuselage 4 and vertical tail 5. Such an arrangement may provide the only, or otherwise additional, means to prevent contaminant ingress transitioning through the interface 12. Alternatively, a seal 21 of predetermined dimensions may be substantially formed using a resilient material such reinforced or unreinforced rubber or silicone, which can then be installed by bonding or by fastening to the first and second fairing portions 10 and 11 before or after the interface 12, is formed.

Figure 16:
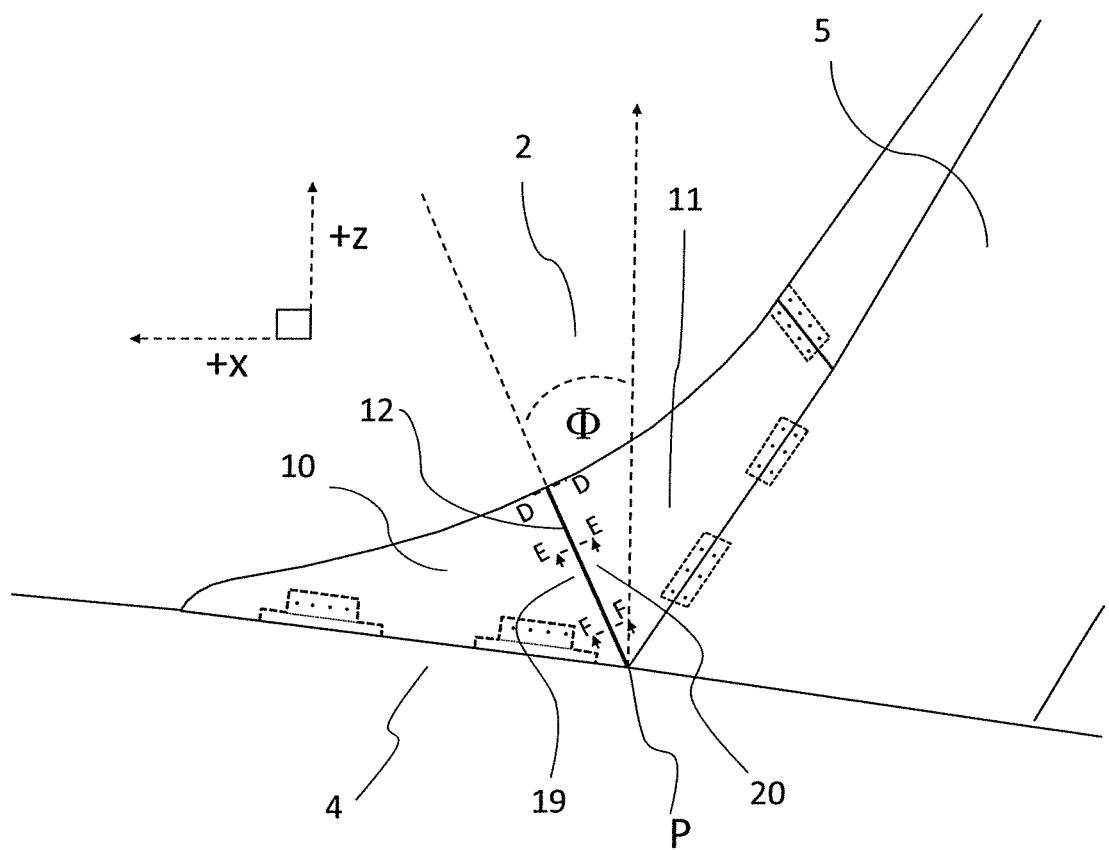
FIG. 16 shows a side elevational view of a third embodiment of a fairing of FIG. 2.
Figure 17:
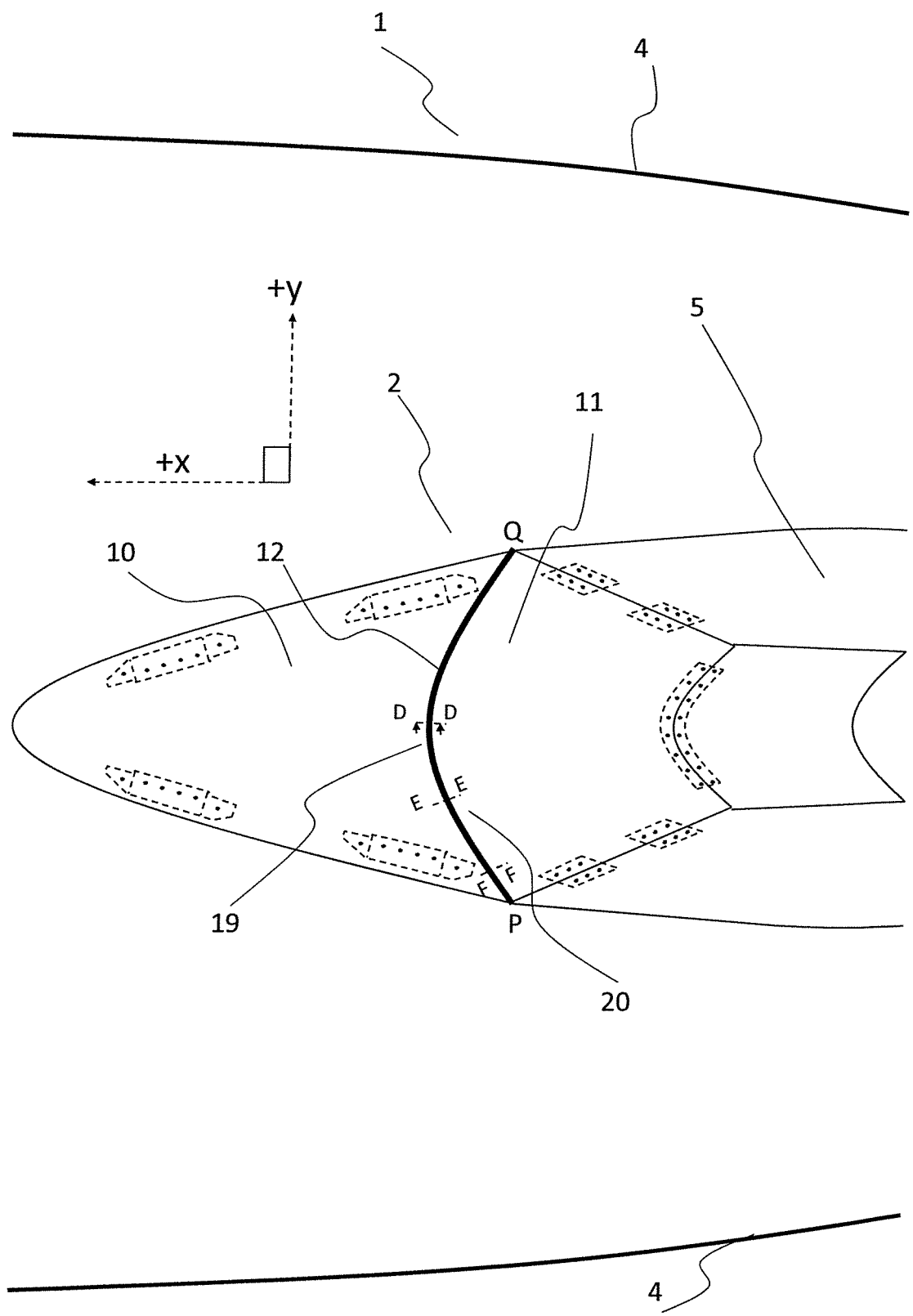
FIG. 17 shows a plan view of the fairing of FIG. 16.

FIGS. 16 to 20A-I describe yet a further embodiment of the invention. In certain circumstances, the 3D shape of the fairing 2 may be highly curved (and therefore the curve of the interface 12 also). The magnitude of relative deflection of the first structural component and second structural component (and hence the movement between the edges 19 and 20) may also depend on the distance of the interface 12 from the points P or Q as shown in FIG. 17. In these circumstances, an overlapping interface needs to be carefully designed. In this further embodiment, the overlapping corresponding edges 19 and 20 of FIG. 12, which define the interface 12 dimensions, have themselves dimensions which vary along the interface length.

FIGS. 16 and 17 show a close-up left-hand side view of the fairing 2 that is substantially in accordance with the previous embodiments of FIGS. 1 to 5 and FIGS. 14A-C. In both FIGS. 16 and 17, the aircraft 1 is in flight in steady and level flight, i.e., during cruise phase of flight. Three section views D-D, E-E and F-F through the interface 12 are provided which correspond to the fairing 2 in the cruise flight condition. The position of section view D-D is the furthest position (mid-length) on the interface 12 from the starting and ending points P and Q.

Figure 18:
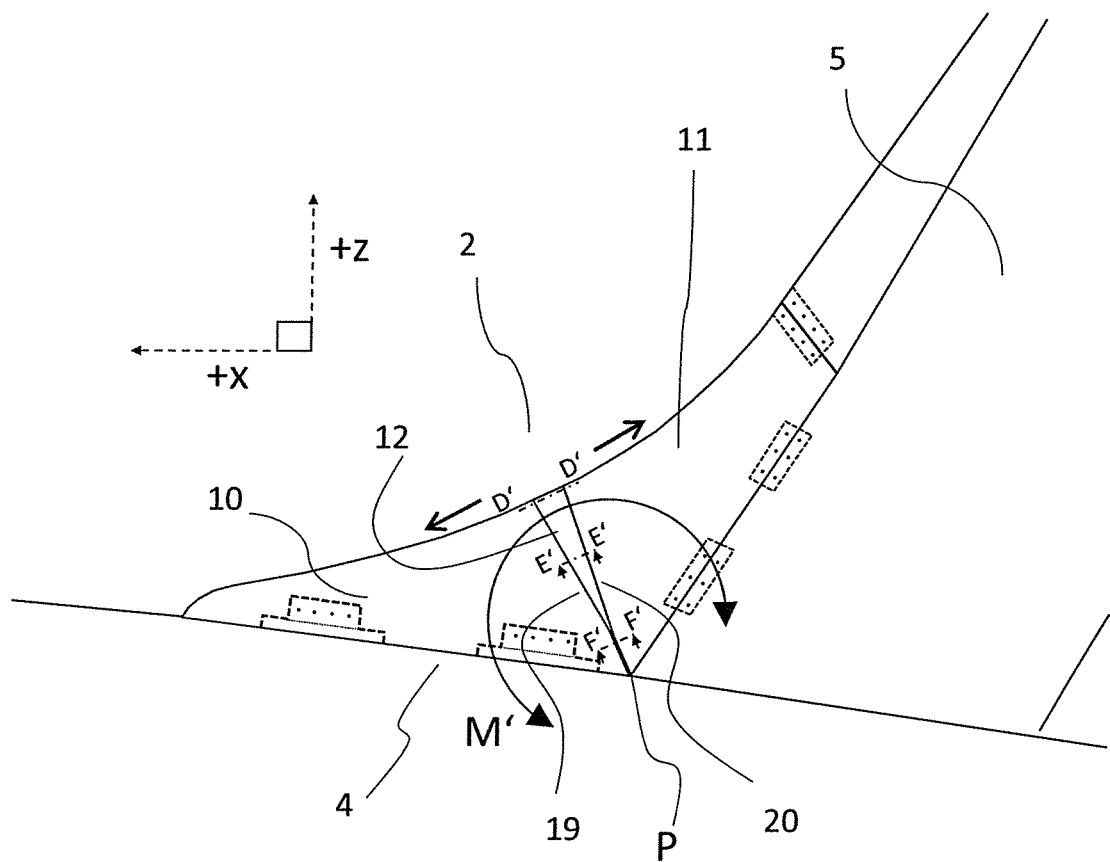
FIG. 18 shows a side elevational view of the fairing of FIG. 16 under a first load condition.

FIG. 18 shows a further close-up left hand side view of the fairing 2 of FIG. 16, except that the aircraft 1 in this instance undergoes the first critical load case whereby the fuselage 4 and vertical tail 5 are subject to a bending moment M' such that both structural components are deflected away from each other by a maximum permissible amount. Three section views D'-D', E'-E' and F'-F' through the interface 12 are shown. Section D'-D' of FIG. 18 is at the same position and orientation along the interface 12 from point P as section D-D of FIGS. 16 and 17, with the only difference being that section D'-D' provides a cross section at when the aircraft experiences the first critical load case. A maximum gap dimension wd' results and is shown for this critical load case in FIG. 20. Similarly, E'-E' and F'-F' correspond to the same positions and orientations of sections E-E and F-F, and the maximum gap dimensions we' and wf' correspond to the each of these sections (and the associated critical load cases), respectively.

Figure 19:
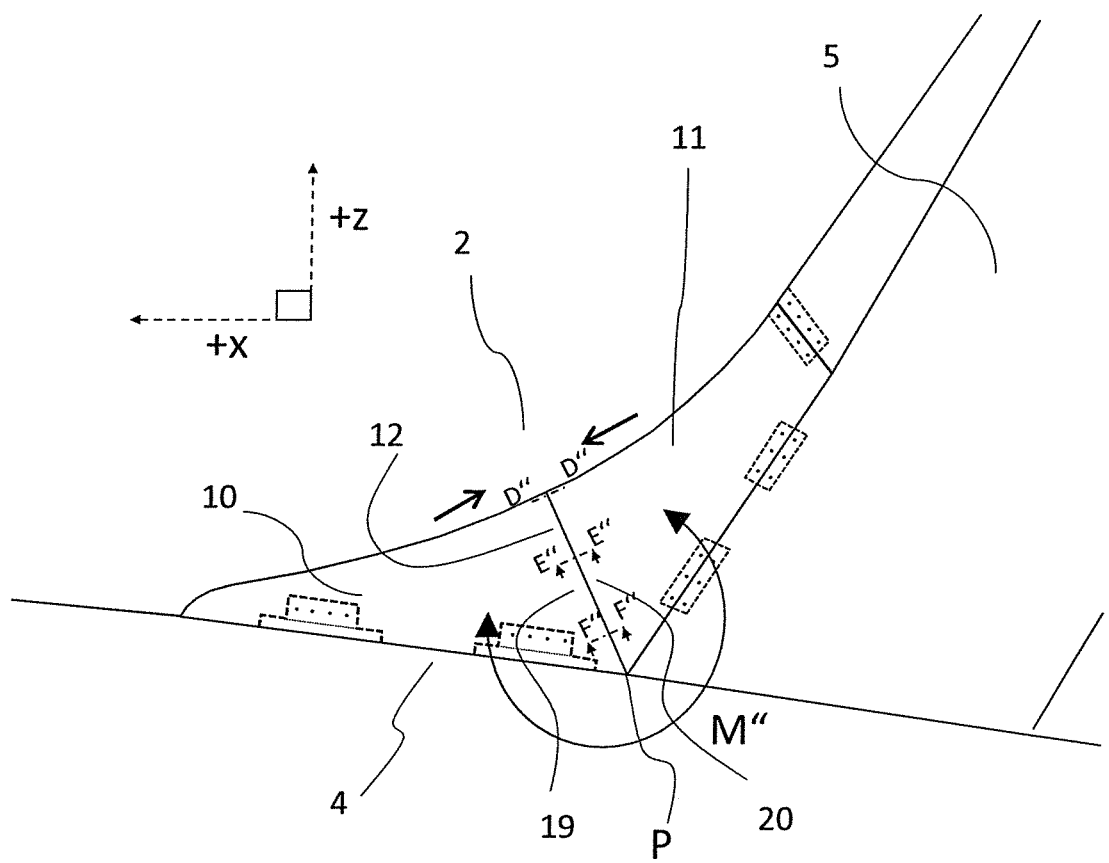
FIG. 19 shows a side elevational view of the fairing of FIG. 16 under a second load condition.

FIG. 19 shows another close-up left-hand side view of the fairing 2 of FIG. 16, except that the aircraft 1 in this instance undergoes the second critical load case whereby the fuselage 4 and vertical tail 5 are subject to a bending moment M" such that both structural components are deflected towards each other to a maximum permissible amount. Three section views D"-D", E"-E" and F"-F" through the interface 12 are also shown. Section D"-D" of FIG. 19 is at the same position and orientation along the moveable interface 12 from point P as section D-D of FIGS. 16 and 17 and hence also section D'-D' of FIG. 18, with the only difference being that section D"-D" provides a cross section when the aircraft experiences the second critical load case. Similarly, E"-E" and F"-F" correspond to the same positions and orientations of sections E-E and F-F, respectively.

FIGS. 20A-I show a compilation of all of the section views indicated in FIGS. 16 to 19, i.e., a section view at each designated position for the cruise, first critical load case and second load case conditions.

As can be seen in the present embodiment, the design of the maximum overlap dimension (previously shown with reference item L in FIG. 14) is not constant along the length of the interface 12. For sections D"-D", E"-E", and F"-F", the respective maximum overlap dimensions LD, LE and LF differ. In combination with FIG. 18, the configuration is such that the relative displacement of the interface 12 is at a maximum at the position of section D'-D', that is, at the position on the interface 12 which is the furthest distance from point P and Q. The maximum dimension of the overlap is decreased monotonically from the position of D'-D' towards point P and point Q such that LD>LE>LF and wd'>we'>wf'. In the present example, there is no overlap remaining at point P and Q, however the point of termination of the overlap can be chosen as desired according to the design.

From FIGS. 20A-I it should be appreciated that the overlap dimension of the interface 12 along its length is further arranged such that dimensions w and w" of the interface 12 are the same for each section position in cruise and for the second critical load case condition.

This ensures that for the cruise condition the aerodynamic drag caused by the dimension w of the interface 12 is minimized consistently along the length of the interface 12. Furthermore, it ensures that for the second critical load case condition, a minimum interface 12 dimension w" is maintained, such that damage that would otherwise occur due to the edge portions 19 and 20 of the first and second fairing portions 10 and 11 contacting one another at any point along the length of the interface 12, is avoided.

Defining an interface 12 in the way described in the present embodiment provides optimum dimensions of the interface 12 during critical loads cases where the magnitudes of the interface dimensions are expected to be at a minimum and at a maximum. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fairing for an aircraft, the fairing comprising:
   a first fairing portion configured to be fixedly attached to a first structural component and having a first edge face;
   a second fairing portion configured to be fixedly attached to a second structural component and having a second edge face, wherein the first edge face and the second edge face define an interface configured to enable relative movement between the first fairing portion and the second fairing portion, wherein the interface is further provided with one or more seals, and wherein each of the one or more seals is fixed directly to the first edge face and the second edge face.

2. The fairing of claim 1, wherein the interface is configured to prevent loads being transferred through the fairing due to relative movement between the first structural component and second structural component.

3. The fairing of claim 1, wherein the seal is formed from a resilient material.

4. The fairing of claim 3, wherein the seal further comprises a deformable cavity.

5. The fairing according to claim 3, wherein the seal is formed from resilient material that is reinforced with glass fibers, polyester fabrics, or meshes.

6. The fairing of claim 1, wherein the seal is formed from at least one ply of resilient material configured to be an outer, inner or intermediate ply attached to the first fairing portion and the second fairing portion, wherein the at least one ply is one of a plurality of plies.

7. The fairing according to claim 1, wherein the interface is further defined by an overlapping surface of the first fairing portion and an overlapping surface of the second fairing portion.

8. The fairing according to claim 7, wherein the overlapping surfaces further comprise a friction reducing coating.

9. The fairing according to claim 8, wherein the friction reducing coating is substantially formed from polytetrafluoroetheylene applied to the overlapping surface of the first fairing portion or the overlapping surface of the second fairing portion.

10. The fairing according to claim 7, wherein the interface is provided with two seals.

11. The fairing according to claim 7, wherein the maximum overlap dimension varies along the length of the interface so as to take into account differences of expected displacement when the fairing is in use.

12. The fairing according to claim 11, wherein the maximum overlap dimension varies monotonically along the length of the interface.

13. The fairing according to claim 1, wherein the first structural component is a fuselage of the aircraft and the second structural component is a vertical tail of an aircraft.

14. An aircraft comprising a fairing according to claim 1.

15. A fairing for an aircraft, the fairing comprising:
   a first fairing portion configured to be fixedly attached to a first structural component and having a first edge face;
   a second fairing portion configured to be fixedly attached to a second structural component and having a second edge face, wherein the first edge face and the second edge face define an interface configured to enable relative movement between the first fairing portion and the second fairing portion, wherein the interface is further provided with one or more seals;
   wherein each seal is formed from at least one ply of resilient material configured to be an outer, inner or intermediate ply attached to the first fairing portion and the second fairing portion, wherein the at least one ply is one of a plurality of plies, and wherein each of the one or more seals is fixed directly to the first edge face of the first fairing portion and the second edge face of the second fairing portion.

16. The fairing according to claim 15, wherein the seal is integral with both the first fairing portion and the second fairing portion.

17. A fairing for an aircraft, the fairing comprising:
   a first fairing portion configured to be fixedly attached to a first structural component and having first edge faces;
   a second fairing portion configured to be fixedly attached to a second structural component and having second edge faces, wherein the first fairing portion and the second fairing portion define an interface configured to enable relative movement between the first fairing portion and the second fairing portion, wherein a surface of the first fairing portion overlaps a surface of the second fairing portion, wherein the interface is further provided with one or more seals, and wherein each seal is attached directly to one of the first edge faces of the first fairing portion and directly to one of the second edge faces of the second fairing portion.

18. The fairing according to claim 17, wherein each seal is disposed inboard or outboard of the overlapping surfaces of the first fairing and the second fairing.

* * * * *